United States Patent [19]

Alten

[11] Patent Number: 4,785,594
[45] Date of Patent: Nov. 22, 1988

[54] DEFORMABLE SEALING ARRANGEMENT FOR THE GAP BETWEEN THE EDGE OF AN OPENING IN A BUILDING AND THE BACK END OF A VEHICLE THAT IS DRIVEN UP TO THE OPENING

[76] Inventor: Kurt Alten, Ringstr. 14, D-3015 Wennigsen, Fed. Rep. of Germany

[21] Appl. No.: 90,170

[22] Filed: Aug. 27, 1987

[30] Foreign Application Priority Data

Sep. 2, 1986 [DE] Fed. Rep. of Germany ....... 3629787

[51] Int. Cl.$^4$ ................................................. E06B 7/16
[52] U.S. Cl. ................................................. 52/173 DS
[58] Field of Search .................................... 52/173 DS

[56] References Cited

U.S. PATENT DOCUMENTS

| | | | |
|---|---|---|---|
| 3,322,132 | 5/1967 | Rieder | 52/173 DS |
| 3,461,627 | 8/1969 | Conger | 52/173 DS |
| 3,653,173 | 4/1972 | Frommelt | 52/173 DS |
| 3,792,559 | 2/1974 | Frommelt | 52/173 DS |
| 4,495,737 | 1/1985 | Alten | 52/173 DS |
| 4,516,366 | 5/1985 | Alten | 52/173 DS |

Primary Examiner—John E. Murtagh
Attorney, Agent, or Firm—Becker & Becker, Inc.

[57] ABSTRACT

A deformable sealing arrangement for the gap between the edge of an opening in a building and the back end of a vehicle that is driven up to the building. An apron that can be deformed by the vehicle is provided. The two side portions of the apron are secured to the side legs of a rigid, U-shaped frame, and the transverse portion of the apron that is disposed above the opening of the building is secured to the transverse leg of the frame. In order to obtain a good sealing effect for various vehicle contours, no matter how close the vehicle is driven to the building, the side portions of the apron are suspended on support arms that are pivotable against a return force, and are movable about a vertical axis. Tension springs are disposed between the upper edge of the side apron portions and the support arms.

6 Claims, 1 Drawing Sheet

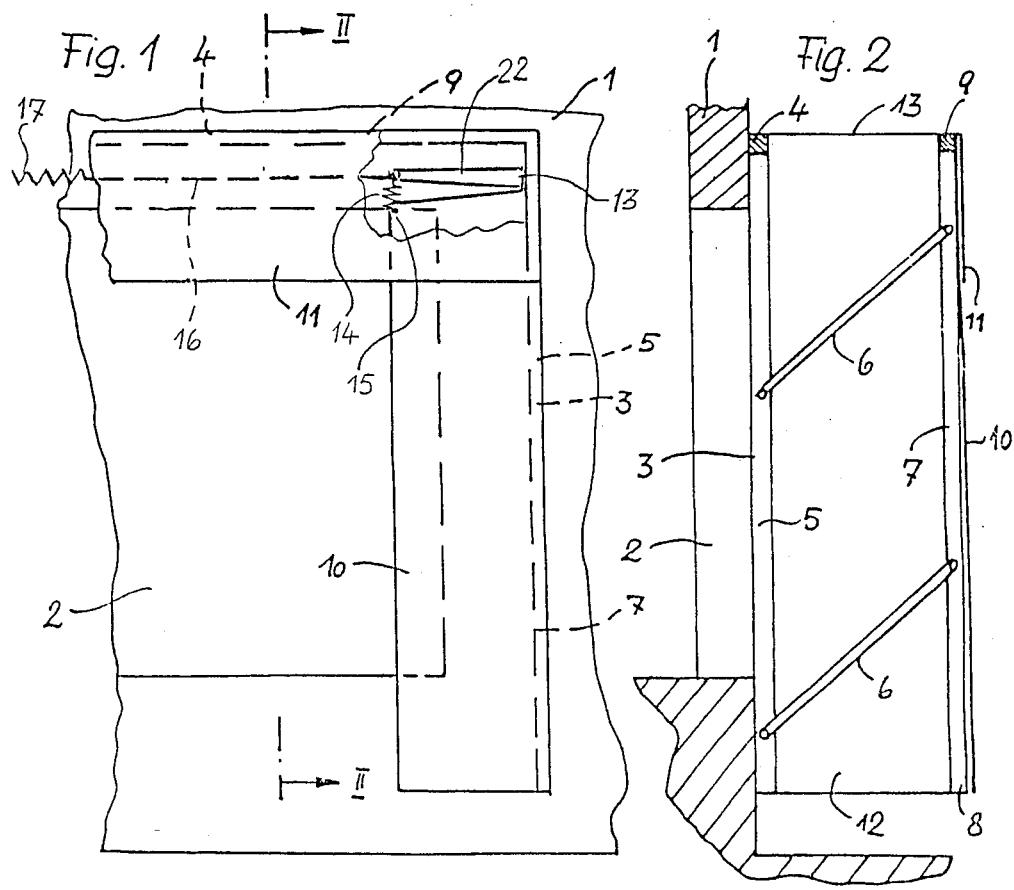
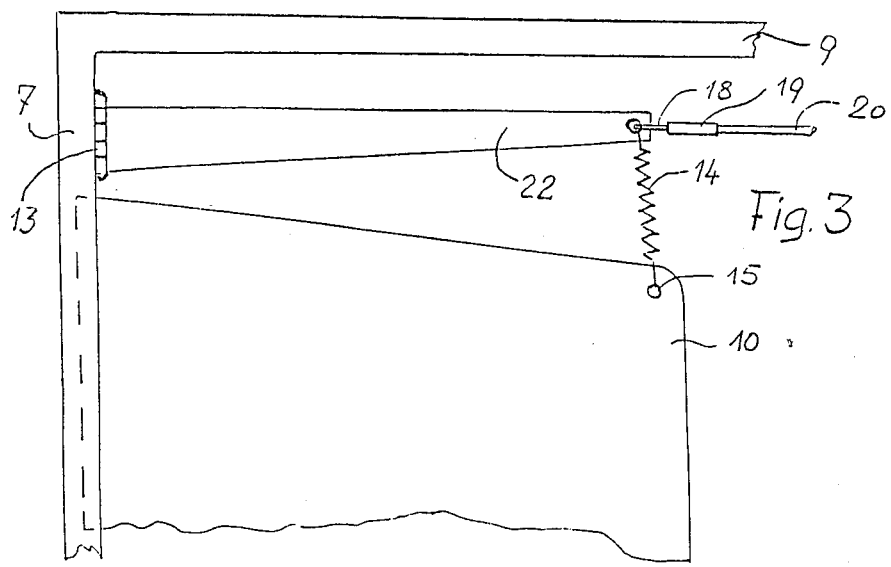

DEFORMABLE SEALING ARRANGEMENT FOR THE GAP BETWEEN THE EDGE OF AN OPENING IN A BUILDING AND THE BACK END OF A VEHICLE THAT IS DRIVEN UP TO THE OPENING

BACKGROUND OF THE INVENTION

The present invention relates to a sealing arrangement for the gap between the edge of an opening in a building and the back end of a vehicle that is driven up to the opening. An apron is secured to the sides and top of a U-shaped frame that is open at the bottom, is disposed at a distance from the building, and is also preferably movable in a direction toward the building. The two side legs of the frame serves to hold the side portions of the apron, and the horizontal, top leg of the frame serve to hold the upper, transversely extending portion of the apron.

The side apron portions must be resilient and must be able to conform to a sufficient extent to the outer contour of a vehicle. This requirement is often difficult to fulfill because the vehicles have different configurations, and in addition are sometimes driven closer to the building than at other times. When tension springs are secured to the upper edge of the apron portions, the spring action cannot be adjusted in such a way that the aforementioned requirements can be fulfilled because the spring stroke and stiffness cannot be optimally set or selected.

It is an object of the present invention to eliminate these drawbacks. In particular, it is an object of the present invention to provide a sealing arrangement that is very effective for vehicles that have very different contours and that are different distances from the building.

BRIEF DESCRIPTION OF THE DRAWING

These and other objectes and advantages of the present invention will appear more clearly from the following specification in conjunction with the accompanying schematic drawing, in which:

FIG. 1 is a fragmentary view of one exemplary embodiment of the inventive sealing arrangement;

FIG. 2 is a cross-sectional view taken along the line II—II in FIG. 1; and

FIG. 3 is a detailed view of a further exemplary embodiment of the inventive sealing arrangement, with the transversely extending apron portion being omitted.

SUMMARY OF THE INVENTION

The deformable sealing arrangement of the present invention is characterized primarily by two support arms, one connected to each side leg of the frame in such a way as to be pivotable about an axis that extends parallel to that leg, with the upper edge of each side apron portion being connected to a respective one of the support arms in such a way that this side apron portion can be resiliently pressed-in in the manner of a door accompanied by the formation of a return force. The two support arms are expediently interconnected via a tension spring arrangement. In addition, a tension spring is advantageously disposed between the end of a given support arm and the pertaining side apron portion.

The support arms, which are movable against the effect of a return force, permit the apron portions to yield to a relatively great extent. The support arms can deflect resiliently to the rear; at the same time, the apron portions in turn deform in order to be able to conform to the various contours of the vehicles. This deformability, which results from the presence of the support arms, is provided even when the vehicles are driven relatively close to the building.

Further specific features of the present invention will be described in detail subsequently.

Description of Preferred Embodiments

Referring now to the drawing in detail, the building 1 has an opening 2 up to which the back end of a vehicle can be driven for loading and unloading thereof. A U-shaped frame 3 extends around this opening 2. The frame 3 is securely connected to the building 1, and has a horizontal leg 4 that is disposed above the opening 2 as well as legs 5 that are disposed on both sides of the opening 2. Hinged to the legs 5 are links 6, the free ends of which are connected to the vertical legs 7 of a similarly U-shaped rigid frame 8, which has a horizontal leg 9; the legs 7 can be made of channel iron. The sizes of the frames 3 and 8 are the same. The frame 8 can be moved in the direction toward the building 1 via the links 6 if a vehicle strikes the frame. The links 6 can be embodied in such a way that their links could be altered.

A flexible, durable apron, which can conform to the shape of the vehicle, and which is in the form of a foil or thin sheet, is provided on the leg 9 and on the two legs 7. This apron comprises two vertical strips 10, and an upper, horizontal strip 11. The strips 10 end below the leg 9; however, the entire length of each strip 10 is connected along the outer side to a respective leg 7. The upper edge of the strip 11 is securely connected to the leg 9, but otherwise hangs freely.

The two frames 3, 8 are connected by a cover, for example a fabric cover. The side portions of the cover are designated by the reference numeral 12, while the upper portion 13 thereof, which acts as a roof, interconnects the legs 4 and 9.

Near the top of the upper edge of the apron strip 11, a respective inwardly extending support arm 22 is pivotably connected to a pertaining leg 7 via a hinge joint 13. The pivot axis exends parallel to the associated leg 7, so that the support arm 22 essentially extends horizontally. The length of each support arm 22 corresponds to the width of the pertaining strip 10, which is suspeneded from the free end of the support arm 22 via a tension spring 14. To receive the latter, the free corner of the apron strip 10, at the upper edge region thereof, is provided with an eye 15. Furthermore, the free end of the two support arms 22 are interconnected by a cable or line 16, in which is interposed a tension spring 17. All of these components are covered by the aprong strip 11 that is disposed at the front, so that from the outside these components are not visible.

In the embodiment illustrated in FIG. 3, the cable 16 and tension spring 17 arrangement is replaced by a short connector 18 with a clip or holder 19; and then an elastic tension spring 20 is connected thereto for example in the form of an elastic line or cord spring, that practically extends over the entire free space between the two support arms 22, and therefore also has a considerable length or elasticity.

If the back end of a vehicle strikes the sealing arrangement, i.e. the apron thereof, the latter can yield somewhat due to the links 6. In addition, the apron can conform to the outer surface of the vehicle, and seals the inner space from the outside. In so doing, the support arms 22 can pivot inwardly in the direction toward the building 1 counter to the effect of the tension springs 17, 20, whereby the strips 10, in turn, can deform in the direction toward the building 1 accompanied by elongation of the respective tension springs 14. When the vehicle is driven away, the sealing arrangement is again deformed via its springs in such a way that the apron returns to its planar position parallel to the building 1. Otherwise, the sealing arrangement is so elastic and conformable that even under rough operating conditions, neither the apron nor the vehicle can be damaged.

The present invention is, of course, in no way restricted to the specific disclosure of the specification and drawing, but also encompasses any modifications within the scope of the appended claims.

I claim:

1. A deformable sealing arrangement for the gap between the edge of an opening in a building and the back end of a vehicle that is driven up to the opening; an apron is secured to the sides and top of a U-shaped frame that is open at the bottom, is disposed at a distance from the building, and is also preferably movable in a direction toward said building, with the two side legs of said frame serving to hold the side portions of said apron, with each side portion having a given width and an upper edge, while the horizontal, top leg of said frame serves to hold the upper, transversely extending portion of said apron; said sealing arrangement further comprising:

two support arms, located above the side portions of said apron and at one end thereof respectively, aid support arms being connected to each side leg of said frame in such a way as to be pivotable via a hinge joint about an axis that extends parallel to that side leg, with said upper edge of each side apron portion being connected to a respective one of said support arms in such a way that said side portions can be resiliently pressed-in in the manner of a door accompanied by the formation of a return force, said upper edge of each side apron portion being connected to its pertaining support arm by a respective tension spring, each of said support arms having a free end remote from its pertaining side leg of said frame, and each of said side apron portions, along said upper edge thereof, having a free upper corner remote from its pertaining side leg of said frame, with each of said tension springs being connected to said free end of one of said support arms as well as to said free upper corner of the pertaining side apron portion.

2. A sealing arrangement according to claim 1, in which each of said support arms essentially extends over said width of the pertaining side apron portion.

3. A sealing arrangement according to claim 1, in which said support arms are interconnected by a tension spring arrangement.

4. A sealing arrangement according to claim 3, in which said tension spring arrangement includes cable means connected to at least one of said support arms, and tension spring means interposed in said cable means.

5. A sealing arrangement according to claim 3, in which said tension spring arrangement essentially extends over the space between ends of said support arms remote from the pertaining side legs of said frame.

6. A sealing arrangement according to claim 5, in which said tension spring arrangement includes an elastic line spring

* * * * *